United States Patent [19]

Schutz

[11] Patent Number: 5,447,250

[45] Date of Patent: Sep. 5, 1995

[54] CONTAINER FOR TRANSPORT AND STORAGE OF LIQUIDS

[76] Inventor: Udo Schutz, Bahnhofstrasse 25, D-56242 Selters, Germany

[21] Appl. No.: 354,141

[22] Filed: Dec. 6, 1994

[30] Foreign Application Priority Data

Dec. 6, 1993 [DE] Germany .................. 43 41 539.1

[51] Int. Cl.⁶ .............................................. B65D 19/00
[52] U.S. Cl. .................................... 220/403; 220/1.5; 220/410
[58] Field of Search ................ 220/403, 410, 1.5, 4.13, 220/462

[56] References Cited

U.S. PATENT DOCUMENTS

| | | | |
|---|---|---|---|
| 4,157,609 | 6/1979 | Schütz | 220/1.5 X |
| 4,173,288 | 11/1979 | Schutz | 220/1.5 |
| 4,909,387 | 3/1990 | Schutz | 220/1.5 X |
| 4,930,661 | 6/1990 | Voorhies | 220/1.5 X |
| 4,961,509 | 10/1990 | Currier | 220/1.5 X |
| 5,110,000 | 5/1992 | Nichols | 220/1.5 X |

*Primary Examiner*—Steven M. Pollard
*Attorney, Agent, or Firm*—Young & Thompson

[57] ABSTRACT

A container (1) which can be used as a retainable or non-retainable container for the transportation and storage of liquids has as its main components a plastic inner tank (2) produced as a blow molded part, with a generally rectangular shape and rounded corners, which is equipped with a filler neck (3) which can be sealed by a screw cap (4) and a drain cock connected to a drain neck (5) in the bottom area. A jacket (8) of galvanized sheet metal has a service opening (9) for the drain cock. A pallet (10) is formed as a flat bottom pan (11) from sheet metal with length and width measurements for form-fitted accommodation of plastic inner container (2). Sheet metal jacket (8) in its lower region has a peripheral taper for supporting the bottom area of inner container (2) in cooperation with the bottom pan (11) of the pallet (10).

7 Claims, 8 Drawing Sheets

CONTAINER FOR TRANSPORT AND STORAGE OF LIQUIDS

The invention relates to containers for transport and storage of liquids with a sealable fill opening and a discharge and flush opening.

The necessity of saving raw materials as well as transport and storage costs and legal environmental protection regulations compel the pertinent industry to fill with liquids large volume metal containers which can be used as retainable containers and which are offered on the market for transport and storage instead of, as in the past, barrels with a much smaller capacity.

The problem of the invention is to develop an economical, large-volume container for liquids with maximum transport safety.

The retainable container according to the invention which consists of a plastic inner container with a sheet metal jacket, based on its being outfitted with a flat bottom pan which is designed as a pallet, which holds the inner container, which is matched to the drainage bottom of the inner container, and which has a hollow chamber bottom as well as a peripheral, external, hollow support collar with good damping capacity and high stiffness both under vibration as well as impact stress, and by its being outfitted with a sheet metal jacket which together with the bottom pan supports the especially endangered bottom area of the inner container, is characterized by high transport and accident safety. Based on the fact that it can be emptied without leaving any residue, the container is especially suited for use in the food industry. The stable sheet metal jacket enables multiple stackability of the container.

The invention is explained below using drawings.

Figure 1:
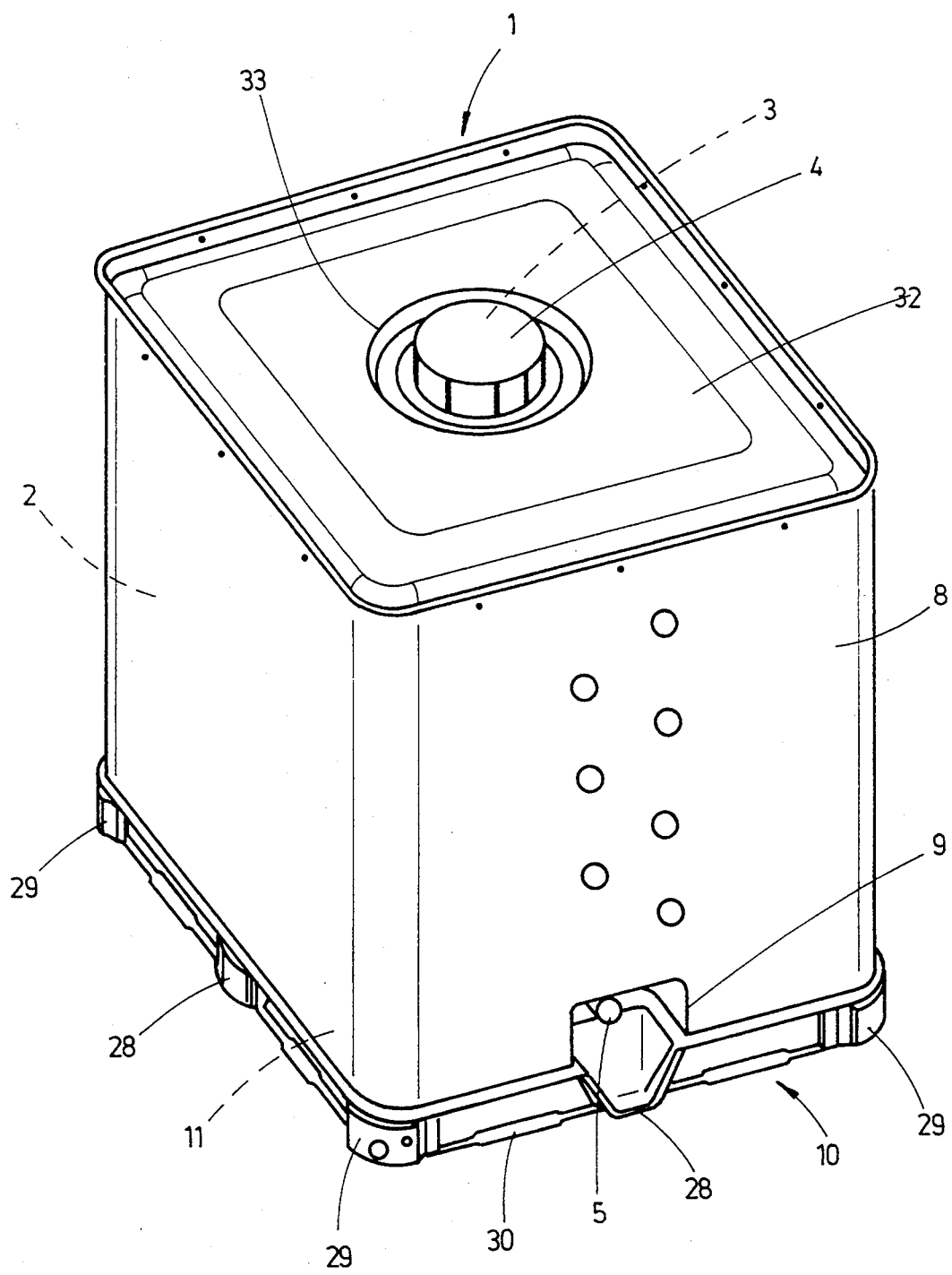
FIG. 1 shows a perspective view of a container with a protective top.
Figure 2:
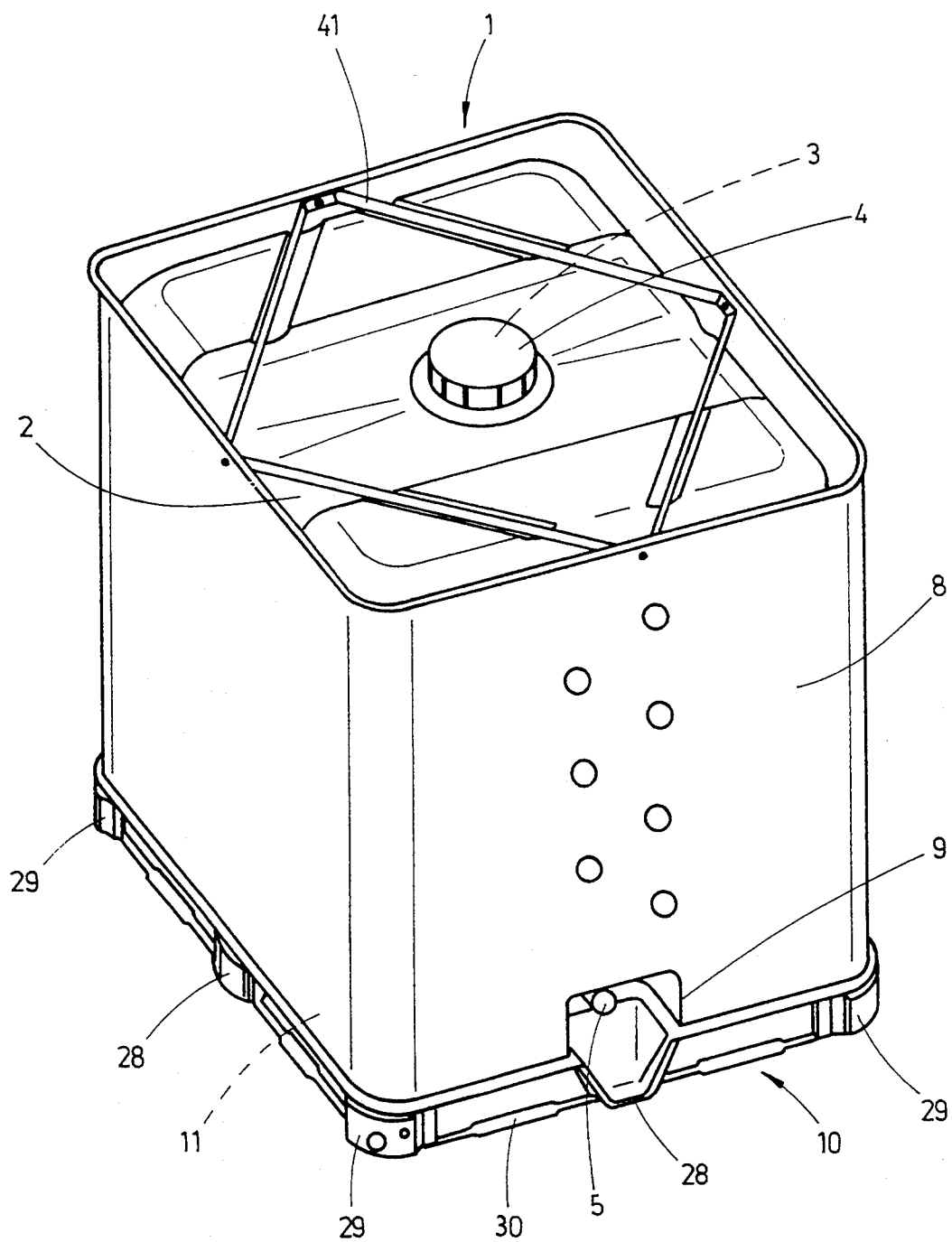
FIG. 2 shows a perspective view of a container with a protective and reinforcing frame.
Figure 3:
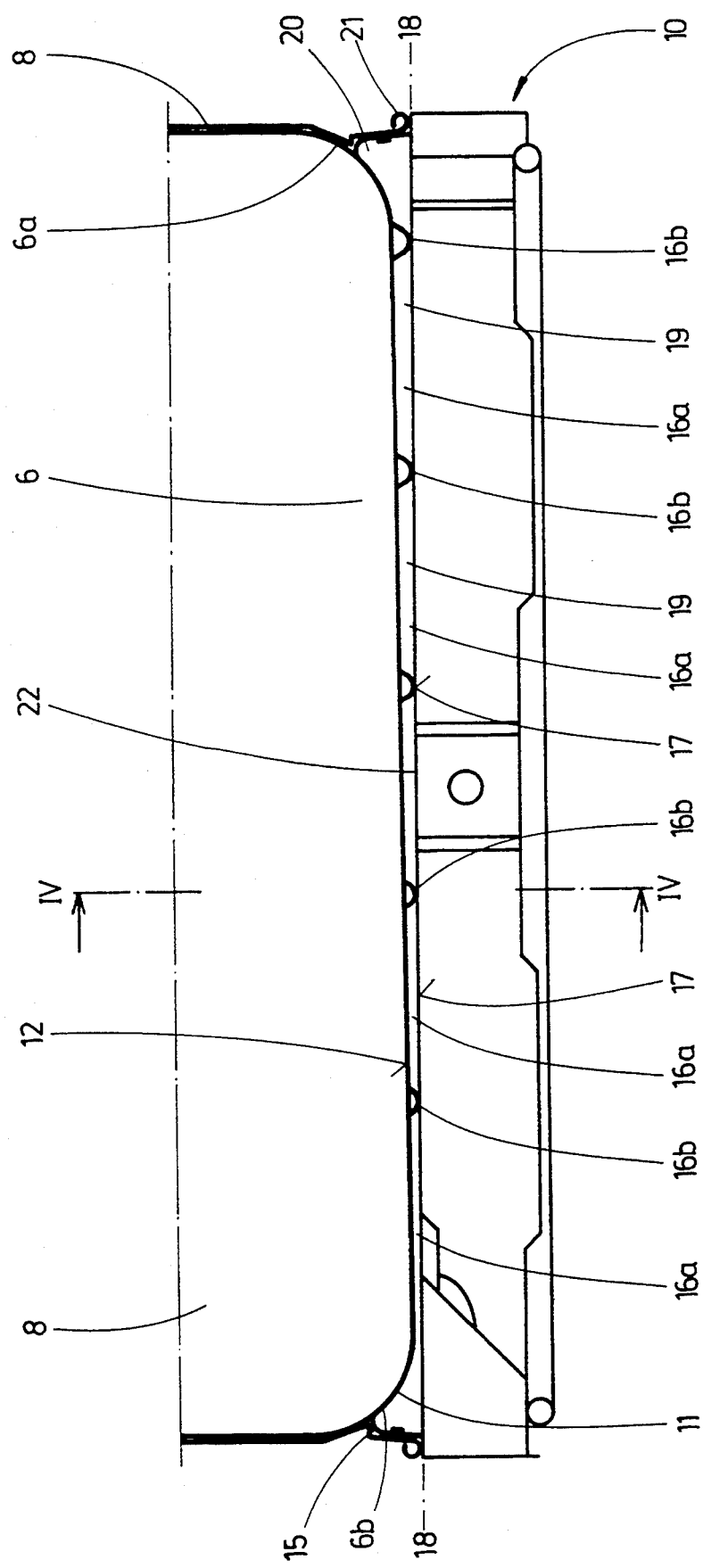
FIG. 3 shows a longitudinal section.
Figure 4:
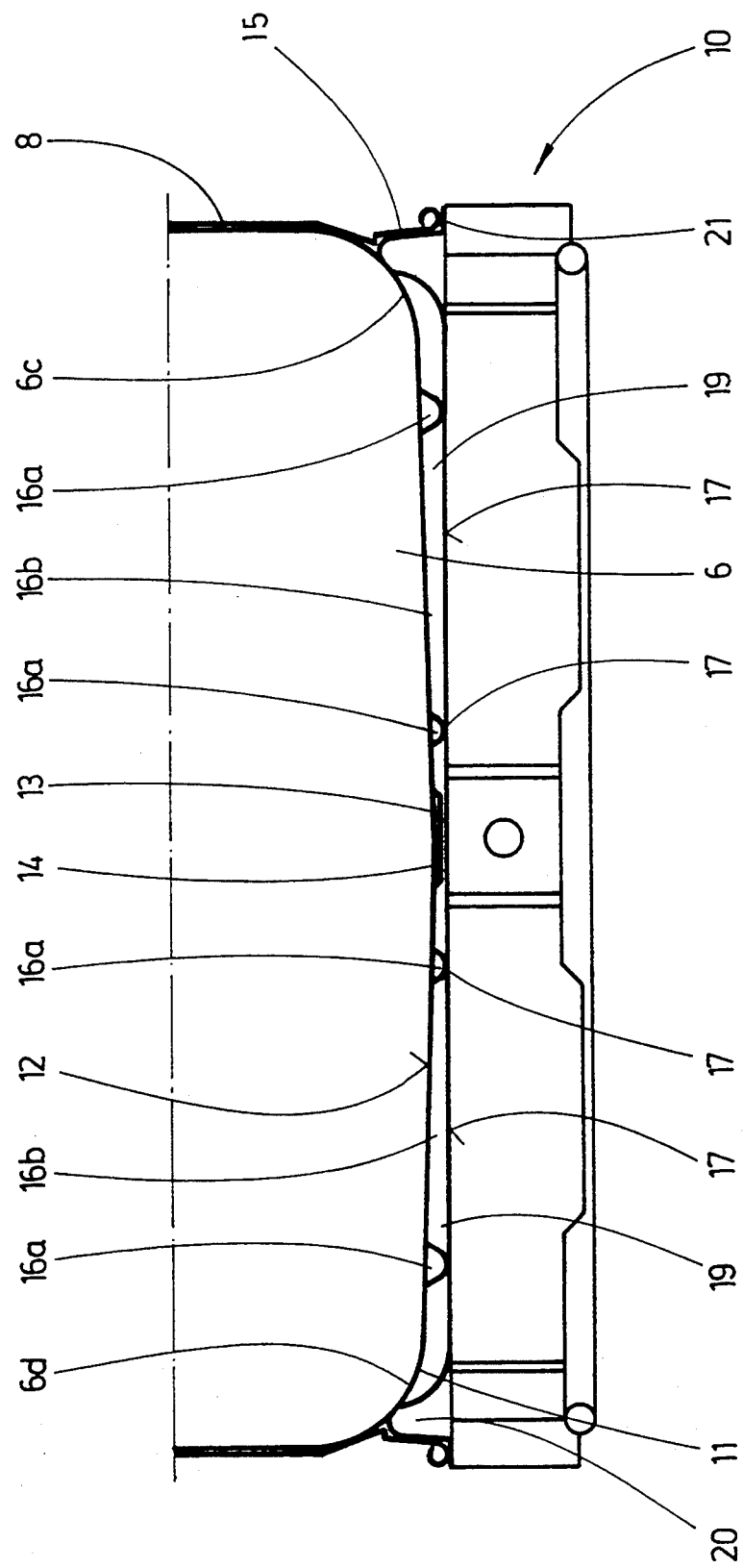
FIG. 4 shows a cross section through the bottom area of the container according to line IV–IV of FIG. 3 in an enlarged representation.

Container 1 which can be used as a retainable or nonreturnable container according to FIGS. 1 and 2 for transport and storage of liquids has as the main components plastic inner tank 2 produced as a blow molded part, with rectangular layout and rounded corners, which is equipped with filler neck 3 which can be sealed by screw cap 4 and drain cock 7 connected to drain neck 5 in bottom area 6, jacket 8 of galvanized sheet metal with service opening 9 for drain cock 7, and pallet 10 formed as flat bottom pan 11 from sheet metal with length and width measurements for form-fitted accommodation of plastic inner container 2 according to European standards.

Bottom area 6 of inner container 2 forms drainage bottom 12 which runs with a slight gradient from rear edge 6a to front edge 6b of bottom area 6 and which moreover slopes down slightly towards the center of the bottom from two side edges 6c, 6d of bottom area 6. In this way drainage bottom 12 of inner container 2 forms flat drain channel 13 slightly sloped towards drain neck 5 in front edge 6b of bottom area 6 of container 2.

Bottom pan 11 of pallet 10 which is deep drawn from sheet metal and which is matched in slope to drainage bottom 12 of inner container 2, with flat center trough 14 which corresponds to drain trough 13 of container 2, has outer support edge 15 which is drawn downward and reinforcing beads 16a, 16b which run in the direction of and transverse to center trough 14; bases 17 of the beads lie in common plane 18—18. Reinforcing beads 16a, 16b and center trough 14 form chambers 19 which are open to the bottom in bottom pan 11, and outer support edge 15 forms peripheral, hollow support collar 20 on bottom pan 11. Bottom pan 11 of pallet 10 formed in this way is characterized by good damping capacity and high stiffness both under vibrational stress due to driving vibrations transmitted from the transport vehicle and surge vibrations proceeding from the liquid transport material as well as under external impact or shock stress so that container 1 fully satisfies high requirements with respect to the required transport and accident safety.

From outer support edge 15 of bottom pan 11 peripheral outer edge strip 21 is bent which forms a subframe with reinforcing strut 22 attached in the center under bottom pan 11.

Sheet metal jacket 8 in the lower area has peripheral taper 23 for supporting bottom area 6 of inner container 2 together with bottom pan 11 of pallet 10.

Figure 5:
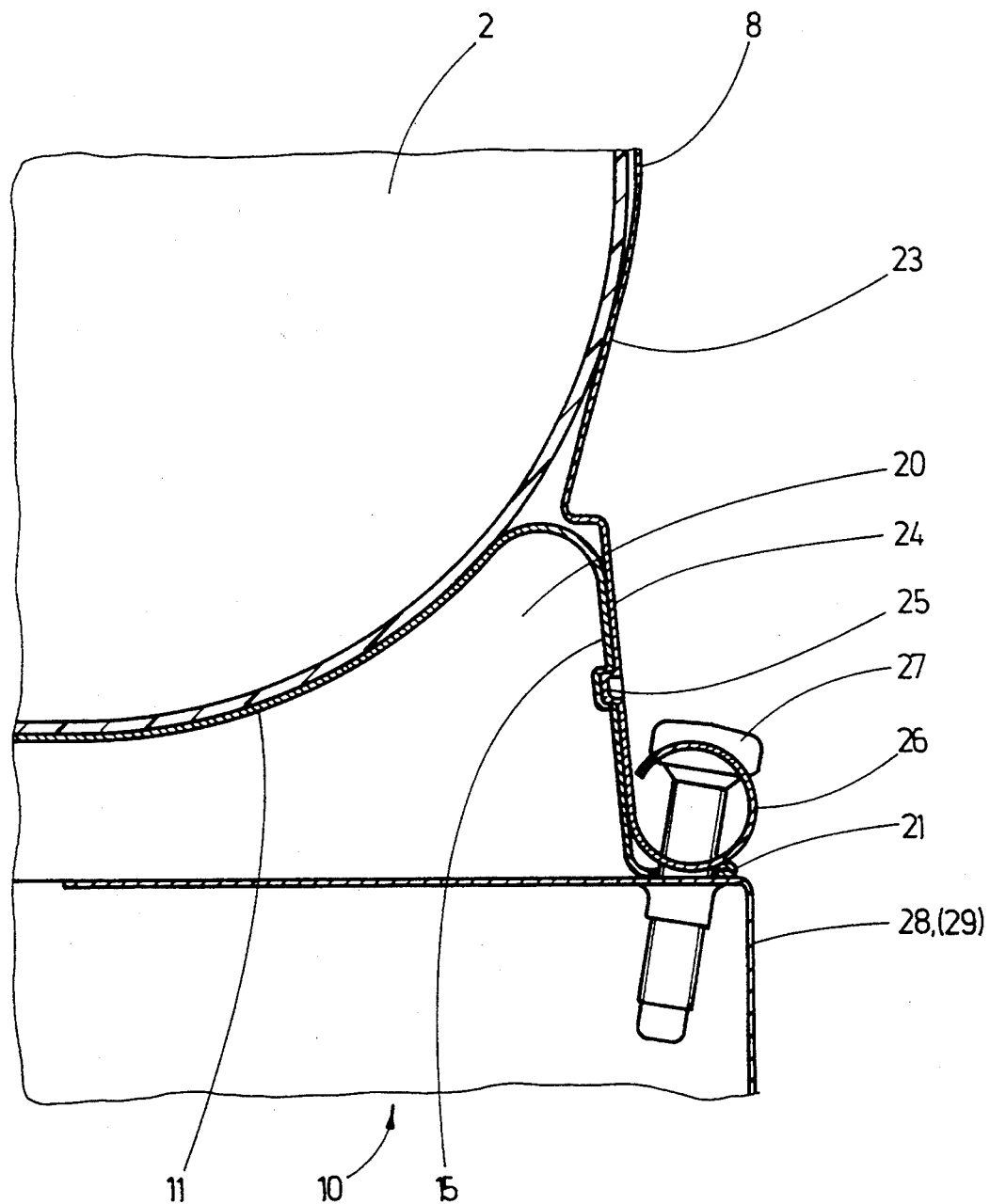
FIG. 5 shows the attachment of the sheet metal jacket to the bottom pan of a pallet.

Adjacent to taper 23 sheet metal jacket 8 has lower support edge 24 which is riveted or welded to support edge 15 of bottom pan 11 or is attached to support edge 15 with rivet-like crimp connections 25 (FIG. 5).

Lower support edge 24 of sheet metal jacket 8 ends in edge 26 swaged to the outside, which rests on peripheral edge strip 21 of support edge 15 of bottom pan 11.

Bottom pan 11 is screwed using self-tapping sheet metal screws 27 to center 28 and corner feet 29 of footed frame 30 of pallet 10 formed as a steel tube frame.

Upper edge 31 of sheet metal jacket 8 of container 1 is profiled as a support edge for pallet 10 of a stacked container.

Figure 6:
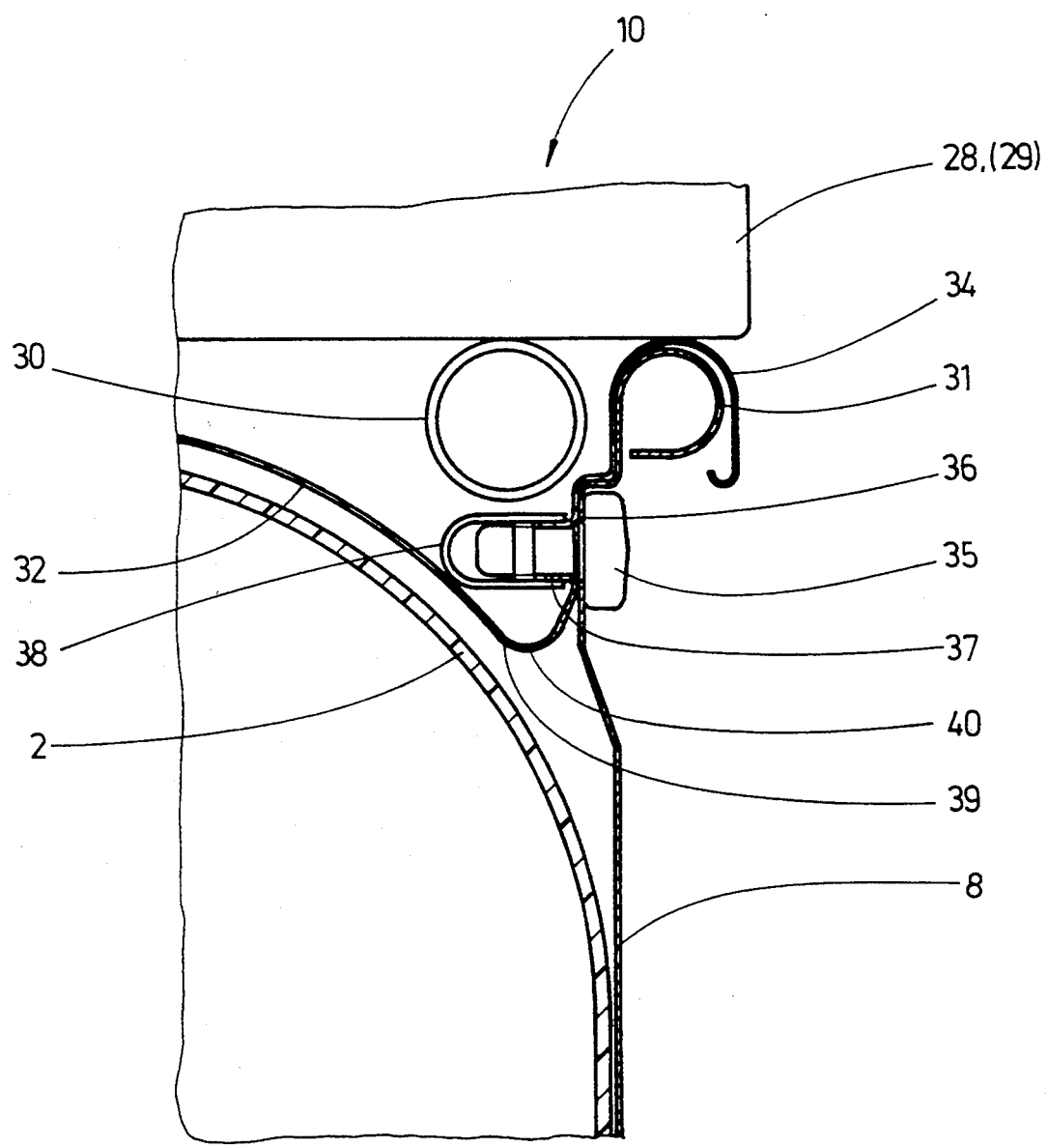
FIG. 6 shows the attachment of a protective jacket.

Container 1 according to FIG. 1 is closed with removable protective top 32 of sheet metal with access opening 33 for fill neck 3 of inner tank 2. Profiled edge 34 of protective top 32 lies on upper edge 31 of sheet metal jacket 8 and is attached to it with self-tapping sheet metal screws 35 which are screwed through holes 36 in sheet metal jacket edge 31 into bushes 37 formed to the inside from protective cover edge 34. Protective caps 38 of plastic or similar material are seated on sheet metal screws 35. Slightly arched protective top 32 forms peripheral outer drain channel 39 with water drain holes 40 (FIG. 6).

Figure 7:
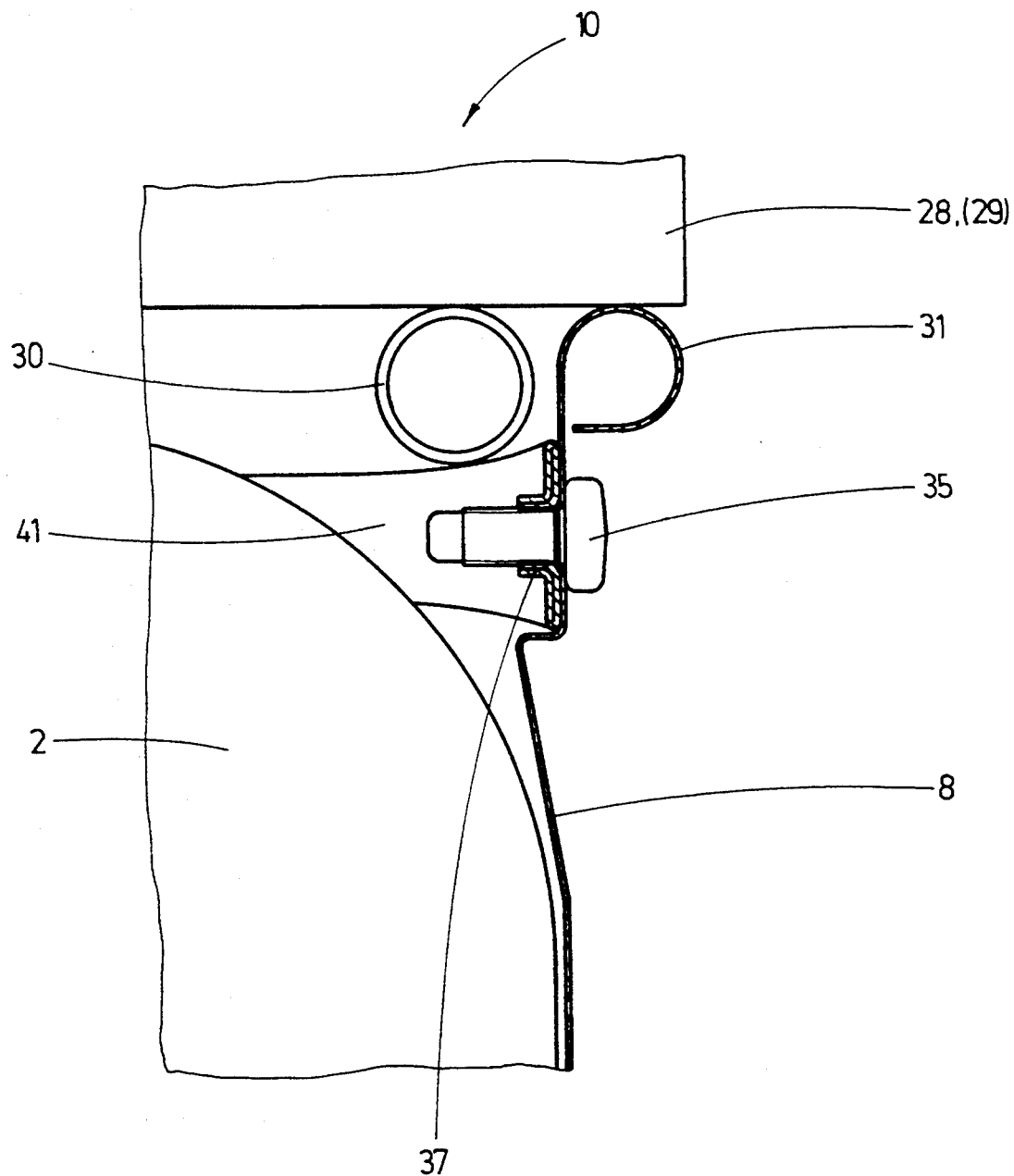
FIG. 7 shows attachment of a protective frame on the upper edge of the sheet metal jacket of the plastic inner container.
Figure 8:
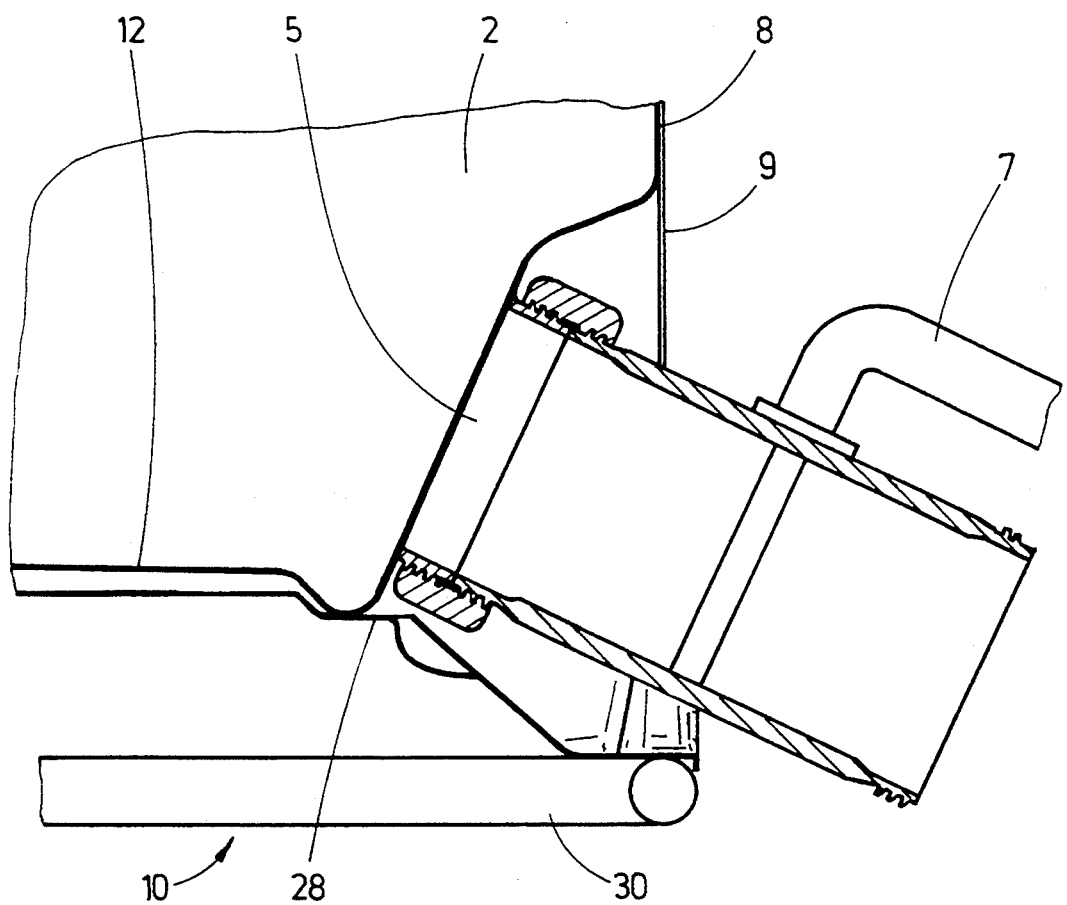
FIG. 8 shows the drain area of the container in cross section.

Container 1 according to FIG. 2 is equipped with protective and reinforcing frame 41 which is screwed to upper edge 31 of sheet metal jacket 8 (FIG. 7).

Figure 9:
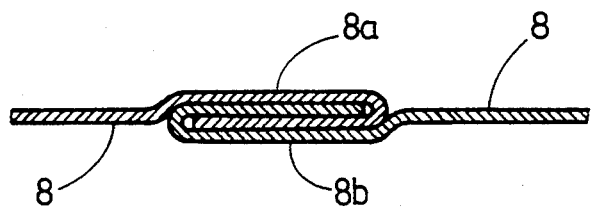
FIG. 9 and FIG. 10 show two-folded seam connections of the abutting edges of the sheet metal jacket of the container.
Figure 10:
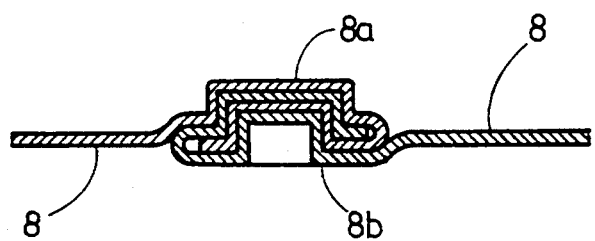

Abutting edges 8a, 8b of jacket 8 produced from sheet metal are each formed as a double seam, hooked to one another and welded (FIG. 9) or are interconnected by rivet-like crimp connections 25 (FIG. 10).

I claim:

1. A container for the transportation and storage of liquids with a sealable fill opening and a discharge and flush opening for connection to a discharge fitting, comprising an inner tank (2) of plastic produced as a blow molded part with a drainage bottom (12) and a sheet metal jacket (8), said inner container (2) resting in a bottom pan (11) formed as a pallet (10), said bottom pan (11) matching in shape said drainage bottom (12) of said inner container (2) and having reinforcing beads (16a, 16b) having bases (17) lying in one common horizontal plane (18—18) and forming chambers (19) in said bottom pan (11), said bottom pan (11) having a downwardly directed outer support edge (15) forming a hollow support collar (20), said bottom pan (11) being mounted on a pallet (10), said sheet metal jacket (8) in a lower region thereof having a peripheral taper (23) for supporting a lower region (6) of said inner container (2) conjointly with said bottom pan (11).

2. A container according to claim 1, wherein an upper edge (31) of said sheet metal jacket (8) is profiled as a support edge for a pallet (10) of a superposed stacked container (1).

3. A container according to claim 1, wherein adjacent to said taper (23) for supporting said inner container (2), said sheet metal jacket (8) has lower support edge (24) which is secured to at least one of said bottom pan (11) and pallet (10).

4. A container according to claim 1, further comprising a removable protective top (32) of sheet metal which has an access opening (33) for providing access to said fill neck (3) of said inner tank (2) and which is secured to an upper edge (31) of said sheet metal jacket (8).

5. A container according to claim 1, further comprising removable protective and reinforcing frame (41) which is screwed to an upper edge (31) of said sheet metal jacket (8).

6. A container according to claim 1, wherein said drainage bottom (12) of said inner container (2) extends with a slight gradient from a rear edge (6a) to a front edge (6b) of said lower region (6) in which said discharge and flush opening is located.

7. A container according to claim 6, wherein said drainage bottom (12) of said inner container (2) has a gradient from two side edges (6c, 6d) of said bottom area (6) toward the middle of the bottom and forms a central, flat drain trough (13).

* * * * *